June 4, 1929.  F. W. BURGER ET AL  1,715,815
ATTACHMENT FOR SHOP TRACTORS
Filed Feb. 27, 1924   2 Sheets-Sheet 1
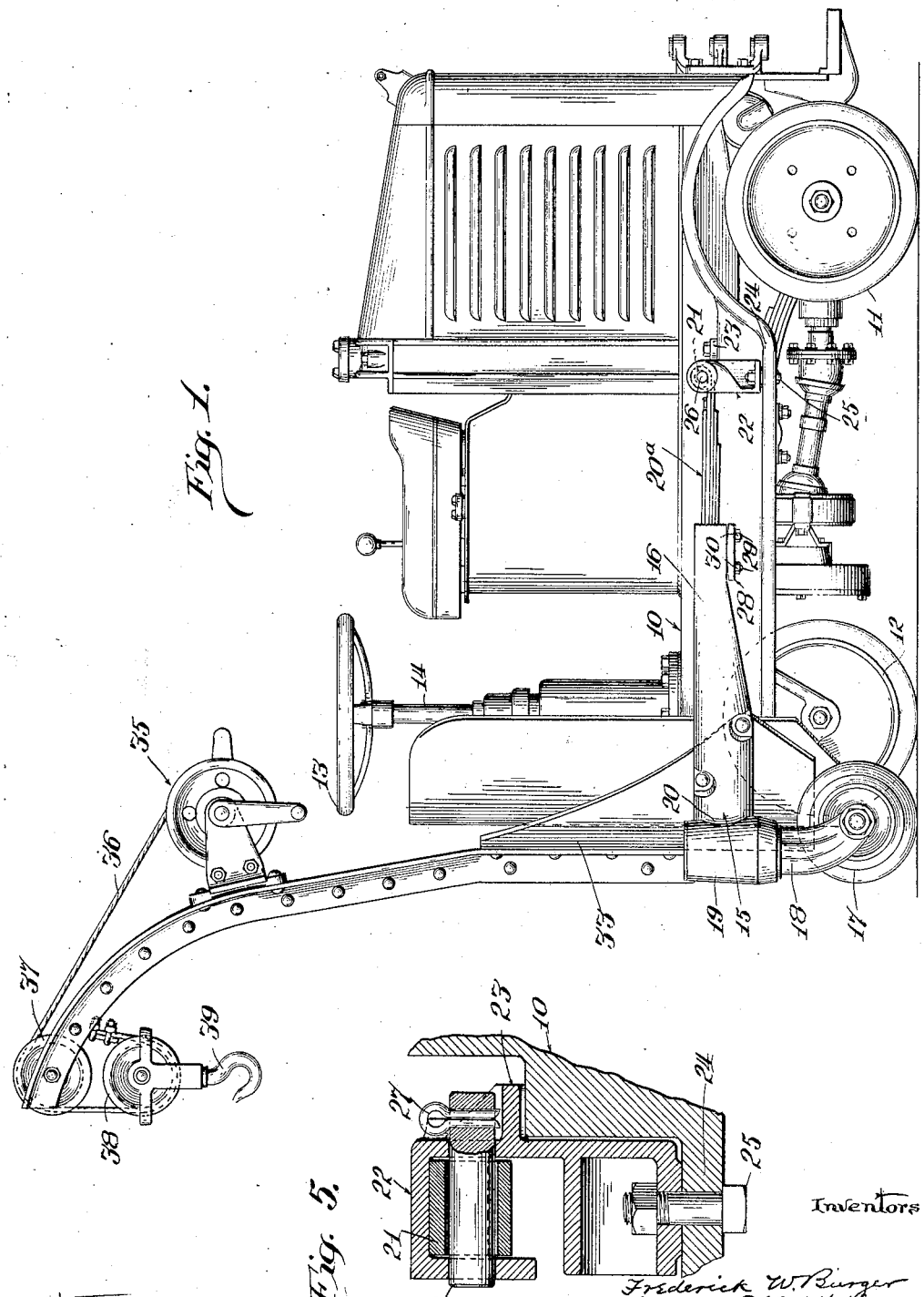

June 4, 1929.  F. W. BURGER ET AL  1,715,815
ATTACHMENT FOR SHOP TRACTORS
Filed Feb. 27, 1924   2 Sheets-Sheet 2
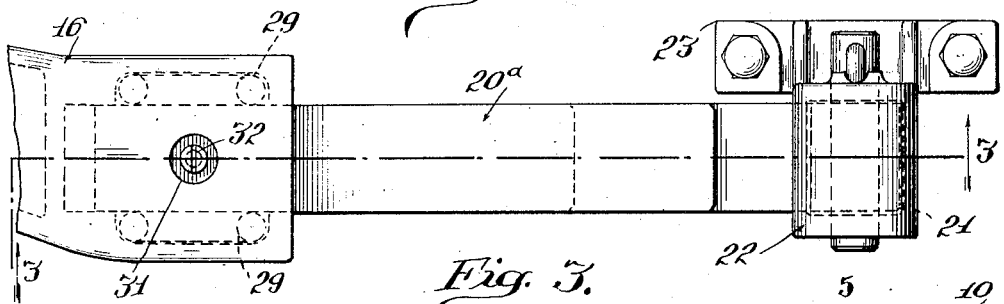
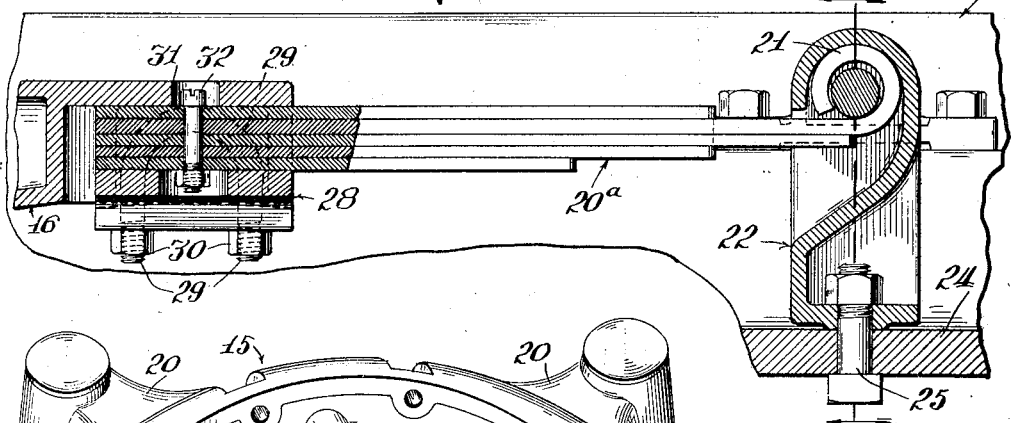
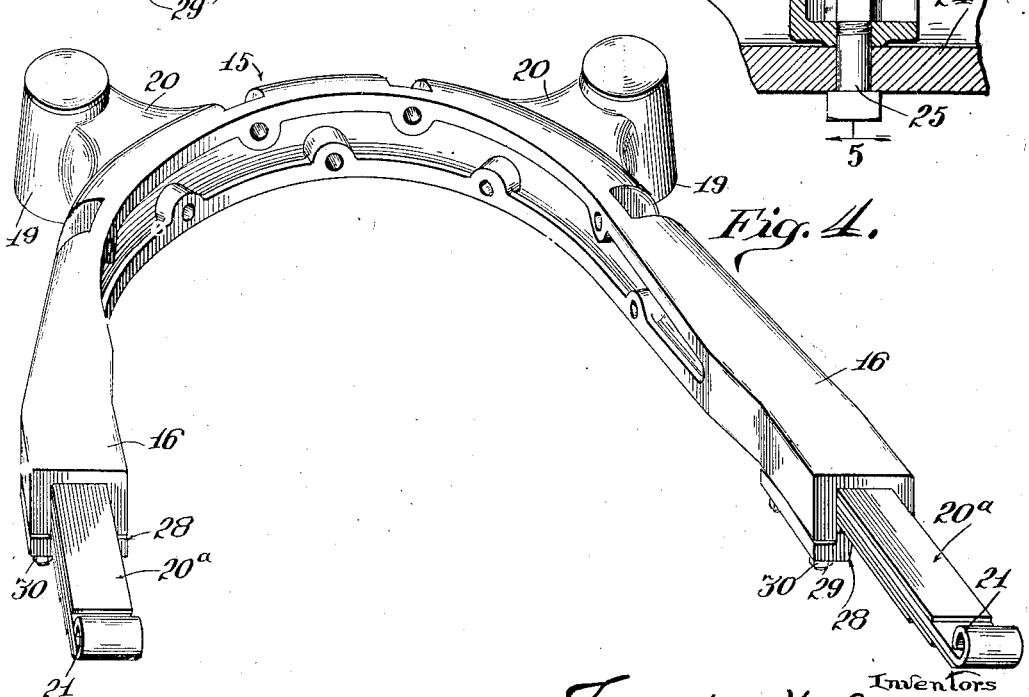

Patented June 4, 1929.

1,715,815

UNITED STATES PATENT OFFICE.

FREDERICK W. BURGER, OF NILES, AND BERGER STOCKFLETH, OF BERRIEN SPRINGS, MICHIGAN, ASSIGNORS TO CLARK TRUCTRACTOR COMPANY, OF BUCHANAN, MICHIGAN, A CORPORATION OF MICHIGAN.

ATTACHMENT FOR SHOP TRACTORS.

Application filed February 27, 1924. Serial No. 695,536.

In connection with that type of motor vehicles generally known in the trade as shop tractors, and which are employed in and around shops and other places for pulling or pushing from place to place trucks for transporting various articles, it has been common to provide various devices for effecting a lifting or lowering of heavy articles that are to be moved from one location to another, but, as pointed out in Patent No. 1,660,413 issued February 28, 1928 on an application filed December 31, 1923, where such elevating mechanisms have constituted one of the relatively-fixed units of the tractor itself it has been necessary, in some situations where various kinds of elevating devices were required on account of the diverse character of the articles to be handled, that a number of such shop tractors be provided, which, of course, meant a matter of very considerable expense. In our said patent is shown and described an attachment in the form of a yoke-shaped frame adapted to be detachably and pivotally connected with the sides of the tractor frame and arranged to support at its forward end a lifting mechanism of any desired type.

Our present invention has reference to a supplemental frame of the general character referred to and has for its object to so improve its construction and the manner of attaching it to the frame of a shop tractor that the jars or shocks incident to its wheels, or the wheels of the tractor, passing over uneven surfaces will be so absorbed or compensated for as to greatly lessen the liability of injury to or disarrangement of the load being carried on the lifting mechanism and also, of course, greatly reducing the liability of damage to the lifting mechanism itself. We accomplish this object by the construction and arrangement shown in the drawings and hereinafter particularly described. That which is believed to be novel will be pointed out in the claims.

In the drawings,—

Fig. 1 is a view in side elevation of a shop tractor with which is operatively connected an attachment embodying our improvements, said attachment having shown connected with it an ordinary crane;

Fig. 2 is a top or plan view of the rear portion of one of the side bar members of the yoke-shaped attachment and the means for connecting it to the adjacent side of the tractor frame;

Fig. 3 is a longitudinal vertical section through the parts shown in Fig. 2,—the section being taken at line 3—3 of Fig. 2;

Fig. 4 is a perspective view of the yoke-shaped attachment; and

Fig. 5 is a vertical section taken at line 5—5 of Fig. 3.

Referring to the several figures of the drawings,—10 indicates the main frame of a motor vehicle of the type employing an internal combustion engine as the motive power, and also of the type which is generally known as a shop tractor, such main frame being preferably formed of a single casting. Upon the frame is mounted a removable hood or casing which encloses the motor and other operating parts. The details of the tractor construction need not be entered into, as in and by themselves they form no part of our present invention, and indeed may vary widely in construction and arrangement. The tractor shown has two supporting wheels at its rear end, the one seen in Fig. 1 being indicated by 11, the axle upon which said wheels are mounted being driven from the engine as usual, and at its front end is a single supporting wheel 12 which is controlled for steering purposes by means of a steering wheel 13 and a steering post 14 which may be operatively connected with said front wheel in any usual manner.

The device with which the present invention is directly concerned comprises a yoke-shaped member or frame, which is indicated generally by 15 and which is preferably made of a single heavy piece of iron channeled at its ends, with the channels opening downward, as clearly shown in Fig. 4. The two approximately parallel arms of this yoke-shaped member, each indicated by 16, are adapted to extend alongside of the side members of the tractor frame 10 and are respectively attached to said frame through the intervention of spring members, as hereinafter described. The bowed forward portion of the yoke-shaped member conforms substantially in shape to the forward end of the tractor frame, and when in place will be but a comparatively slight distance in advance of such frame. At opposite sides of the longitudinal center of the yoke-shaped member are provided wheeled supports, each in the form of a caster wheel, one of which is shown in Fig. 1 and indicated by 17, each caster wheel being mounted between the arms of a yoke 18 from which rises a tapered standard that is suitably journaled in the sleeve portion 19 of a bracket 20 that, as here shown, is formed integral with the yoke-shaped member 15. The mounting means for these wheeled supports may be as shown in our said former application, or otherwise.

Secured to the end portion of each side bar member 16 of the yoke-shaped frame, and projecting rearwardly therefrom, is a cantilever spring 20$^a$, each formed of a plurality of long, heavy leaves laid one upon the other, the forward ends of which leaves are preferably in vertical alinement, as shown in Fig. 3, but with one of such leaves considerably longer than the others so as to be adapted to have its rear end portion turned to form an eye 21. This eye portion 21 is, in the construction shown, housed in the upper part of a bracket 22 that lies alongside of one of the side bar members of the tractor frame and has a flange 23 that rests upon and is bolted to a shoulder formed by the thickening of that part of the tractor frame, as clearly shown in Fig. 5, and also rests at its lower end upon the running board or step 24 at that side of the tractor frame. The bracket is further secured in place by a bolt 25 that passes through a flange on its lower end and through such running board or step. 26 indicates a heavy stud that passes through the front and rear walls of this bracket 22 and through the eye 21 of the spring member, thereby holding the spring member in the housing part of the bracket. The stud 26 is held against withdrawal by a cotter pin 27 passed through a hole in its projecting inner end. It will be seen by reference to Fig. 3 that the stud is not closely embraced by the eye 21, and it will also be seen that the eye lies rather tightly pressed against the surface of the housing member of the bracket. This is because of the fact that reliance is not placed upon the stud 26 for bearing the strains imposed upon the spring member, but the bracket itself is relied upon for sustaining such strains, and accordingly such bracket is very solidly constructed and very rigidly connected at the points named with the tractor frame. The principal office of the stud is to ensure against disconnection of the spring member from the bracket.

The several leaves that constitute each of the springs 20$^a$ are of a width to approximately fill the channel of the yoke-shaped member, and they may be removably secured therein by any suitable means. As here shown, each of said springs is secured in place by means of a bridging member or plate 28 that extends across the channel and has a raised central portion between which and the upper wall of the channel iron the spring is held, such plate being secured by oppositely located U-bolts 29 that lie in correspondingly shaped recesses formed in the inner faces of the flanges of the channel iron beam and upon the screw-threaded ends of which bolts are screwed nuts 30. The manner of seating these U-bolts in the recesses referred to is fully shown and described in our Patent Number 1,584,977, issued May 18, 1926, and it is therefore not deemed necessary to more fully illustrate or describe the same. Through the upper wall of each side member 16 of the yoke-shaped frame is a hole 31 through which access may be had to the bolt 32 that is employed for securing the ends of the several leaves of the spring together.

At the forward end of the yoke-shaped member 15 there is provided a curved plate 33 which constitutes not only a gusset for stiffening purposes, but also a means for attaching any desired form of elevating mechanism. This gusset plate will preferably be riveted against the inner surface of the member 15, the holes for such rivets being shown in the perspective view in Fig. 4, and riveted to that gusset plate and rising therefrom will be an elevating apparatus of any desired character. As in our patent Number 1,660,413 issued February 28, 1928, the elevating apparatus is shown as an ordinary crane, upon which is mounted a hand-operated windlass 35 upon which is wound a cable 36 that runs through ordinary sheaves 37, 38, from the latter of which is sustained a hook 39 that is adapted to engage with an article to be lifted and transported.

By our invention relative movement between the yoke-shaped supplemental frame 15 and the frame of the tractor is readily had, and by combining with such supplemental frame the springs that in effect form prolongations or extensions of the sides thereof, such springs, while permitting the desired amount of pivotal movement, will also absorb the shocks and jars incident to the device traveling over an uneven surface to such an extent that the lifting mechanism and the articles carried thereby will not be injuriously affected thereby.

What we claim as our invention and desire to secure by Letters Patent, is—

1. A shop tractor attachment comprising in combination an approximately U-shaped frame adapted to lie opposite the sides and front of a tractor and to be connected therewith, caster wheel supporting means for the forward portion of said frame, springs connected with the rear portions of said frame for connecting the same with the tractor and limiting its up and down movement with respect thereto, and load sustaining means at the forward part of said frame.

2. A shop tractor attachment comprising a frame adapted to be associated with one end of a tractor and having side members adapted to be attached to the tractor and extend laterally of the opposite sides thereof, springs carried by said side members and connected with the tractor, a pair of laterally spaced caster wheels supporting said frame, and load-sustaining means carried by said frame.

3. A shop tractor attachment comprising a wheel supported frame adapted to be associated with one end of a tractor and having side members extending in one direction from the wheel support of said frame and adapted to be attached to the tractor at opposite sides thereof, springs carried by said side members and connected with the frame of the tractor, and load-sustaining means carried by said attachment frame and extending outward therefrom at the opposite side of the wheel support thereof.

4. The combination with a shop tractor having dirigible and propelling wheels at opposite ends thereof, of a wheeled frame adapted to be associated with the tractor at the dirigible wheel end thereof, said frame comprising side members at each side of the tractor and springs connected with said side members and with the tractor, a pair of laterally spaced caster wheels secured to and supporting said frame, said caster wheels being disposed in close proximity to the end of said tractor, and load-sustaining means carried by said frame.

5. The combination with a shop tractor having dirigible and propelling wheels at opposite ends thereof, of a wheeled frame adapted to be associated with the tractor at the dirigible wheel end thereof, said frame comprising side members at each side of the tractor and springs connected with said side members and with the tractor, and load-sustaining means carried by said frame and extending outward therefrom in the opposite direction from said side members and beyond the wheel support of said frame.

6. The combination with a shop tractor having front and rear wheels, of a frame comprising side bars at opposite sides of the tractor, means comprising vertically movable leaf springs securing the rear end portions of said bars to the tractor, laterally spaced caster wheels for said frame adjacent to its forward end, and load-sustaining means secured to the forward portion of said frame beyond said caster wheels.

7. The combination with a shop tractor having front and rear wheels, of a U-shaped frame comprising side members at opposite sides of the tractor, means comprising vertically movable leaf springs securing the rear end portions of said side members to the tractor at points in rear of the forward wheeled support of the tractor, load-hoisting means secured to the forward portion of said frame, and a caster wheel support for said U-shaped frame disposed in rear of said hoisting means.

8. The combination with a shop tractor comprising front and rear wheels and a frame mounted thereon, of a load-hoisting attachment for said tractor comprising a U-shaped frame adapted to embrace one end of said tractor and comprising side arm portions, vertically movable leaf springs secured to said side arm portions in prolongation thereof and adapted to extend adjacent the sides of said tractor frame, means for detachably connecting said leaf springs to said tractor frame, a wheeled support for supporting the front end of said attachment frame, and means adjacent the front end of said attachment frame for the attachment of load-hoisting mechanism.

9. The combination with a shop tractor comprising front and rear wheels and a frame permanently mounted thereon, of a load-hoisting attachment for said tractor comprising a yoke shaped frame adapted to embrace one end of said tractor and comprising side arm portions, spring means fixedly secured to the side arm portions of said attachment frame, means for detachably connecting said spring means to said tractor frame, a wheeled support for supporting the front end of said attachment frame, and load-hoisting means carried by said attachment frame.

10. The combination with a shop tractor comprising front and rear wheels and a frame carried thereby, of a load-hoisting attachment for said tractor comprising a frame adapted to be coupled to said tractor in close proximity to the front end of the latter, said attachment frame comprising side arm portions, springs fixedly secured to said side arm portions and embracing the sides of said tractor, means for detachably connecting the ends of said springs to said tractor frame on a substantially horizontal pivotal axis disposed intermediate the front and rear wheels of said tractor, a caster wheel for the front end of said attachment frame, and load-hoisting means carried by said attachment frame.

11. The combination with a shop tractor having dirigible and propelling wheels at opposite ends thereof, of an attachment therefor comprising an approximately U-shaped frame adapted to embrace the dirigible wheel end of the tractor, leaf springs connected with and projecting rearwardly from the rear end portions of said U-shaped frame, an eye at the rear end of each of said leaf springs, brackets carried by the tractor against which said eye portions of the springs respectively bear, studs supported by said brackets and passing through said eyes for detachably holding said spring members in place, a pair of laterally spaced caster wheels secured to and supporting said U-shaped frame, said caster wheels being disposed on the outer sides of and in close proximity to the dirigible wheel support of said tractor, and load hoisting means carried by said U-shaped frame and extending outwardly therefrom beyond said caster wheels.

12. The combination with a shop tractor having end and side frame portions and dirigible and propulsion wheels, of a yoke shaped attachment frame adapted to embrace the end of said tractor frame and comprising two spaced arms extending back alongside the side portions of said tractor frame, and cantilever springs mounting the arms to the side of the side portions of said tractor frame.

13. The combination with a shop tractor having end and side frame portions and dirigible and propulsion wheels, of a yoke shaped attachment frame adapted to embrace the dirigible wheel end of said tractor frame and comprising two spaced arms extending back alongside the side portions of said tractor frame, cantilever springs mounting the arms to the side portions of said tractor frame, and a self steering wheel supporting the yoke portion of said attachment frame.

14. The combination with a vehicle, of a frame, a self steering wheel supporting one end of the frame, said frame including a pair of parallel arms extending horizontally from said wheel support, a material carrying support mounted on said frame adjacent said wheel support and extending oppositely to said arms, the axis of the wheel normally forming a pivot for said frame and supporting structure, and spring means securing the arms to the vehicle and limiting the extent of tilting of said frame about the wheel axis.

FREDERICK W. BURGER.
BERGER STOCKFLETH.